US012596205B2

(12) United States Patent
Byun et al.

(10) Patent No.: US 12,596,205 B2
(45) Date of Patent: Apr. 7, 2026

(54) ANTI-REFLECTIVE FILM, POLARIZING PLATE, AND DISPLAY APPARATUS

(71) Applicant: LG CHEM, LTD., Seoul (KR)

(72) Inventors: Jinseok Byun, Daejeon (KR); So Young Kim, Daejeon (KR); Yeongrae Chang, Daejeon (KR); Jung Hyun Seo, Daejeon (KR); Kwangseok Seo, Daejeon (KR)

(73) Assignee: Xinmei Fontana Holding (Hong Kong) Limited, Hong Kong (CN)

( * ) Notice: Subject to any disclaimer, the term of this patent is extended or adjusted under 35 U.S.C. 154(b) by 60 days.

(21) Appl. No.: 16/964,715

(22) PCT Filed: Oct. 17, 2019

(86) PCT No.: PCT/KR2019/013680
§ 371 (c)(1),
(2) Date: Jul. 24, 2020

(87) PCT Pub. No.: WO2020/080859
PCT Pub. Date: Apr. 23, 2020

(65) Prior Publication Data
US 2020/0348450 A1 Nov. 5, 2020

(30) Foreign Application Priority Data

Oct. 17, 2018 (KR) ........................ 10-2018-0123703
Oct. 17, 2018 (KR) ........................ 10-2018-0123704
(Continued)

(51) Int. Cl.
*G02B 1/111* (2015.01)
*B82Y 30/00* (2011.01)
(Continued)

(52) U.S. Cl.
CPC .......... *G02B 1/111* (2013.01); *C08F 283/006* (2013.01); *C08G 18/673* (2013.01);
(Continued)

(58) Field of Classification Search
CPC .. G02B 1/111; G02B 1/14; G02B 1/12; G02B 5/305; C08J 7/046; C08J 5/18;
(Continued)

(56) References Cited

U.S. PATENT DOCUMENTS 5,863,468 A * 1/1999 Czubarow ............ H01C 17/281
252/521.5
7,332,213 B2 2/2008 Mimura et al.
(Continued)

FOREIGN PATENT DOCUMENTS

CN 101802060 A 8/2010
CN 104749679 A 7/2015
(Continued)

OTHER PUBLICATIONS

Dulmage, W.J. and Geddes, A.L. (1958), Structure of drawn polyethylene terephthalate. J. Polym. Sci., 31: 499-512. https://doi.org/10.1002/pol.1958.1203112326 ; https://onlinelibrary.wiley.com/doi/epdf/10.1002/pol.1958.1203112326 (Year: 1958).*
(Continued)

*Primary Examiner* — Tamra L. Dicus
(74) *Attorney, Agent, or Firm* — Ricky Lam

(57) ABSTRACT

The present invention relates to an anti-reflective film that comprises a low moisture permeable polymer film, a hard coating layer and a low refractive index layer and that has low reflectance deviation and light transmittance deviation, can simultaneously realize high scratch resistance and anti-fouling property, and can increase screen sharpness of a display apparatus, a polarizing plate and a display apparatus comprising the same.

7 Claims, 2 Drawing Sheets

(30) Foreign Application Priority Data

| | | |
|---|---|---|
| Oct. 17, 2019 | (KR) | 10-2019-0128927 |
| Oct. 17, 2019 | (KR) | 10-2019-0128928 |

(51) Int. Cl.

| | |
|---|---|
| *C08F 283/00* | (2006.01) |
| *C08G 18/67* | (2006.01) |
| *C08G 18/76* | (2006.01) |
| *C08G 77/04* | (2006.01) |
| *C08J 5/18* | (2006.01) |
| *C08J 7/04* | (2020.01) |
| *C08J 7/046* | (2020.01) |
| *C08K 3/36* | (2006.01) |
| *C08K 7/22* | (2006.01) |
| *C08K 7/26* | (2006.01) |
| *C08L 25/14* | (2006.01) |
| *C08L 51/08* | (2006.01) |
| *C09D 133/08* | (2006.01) |
| *G02B 1/12* | (2006.01) |
| *G02B 1/14* | (2015.01) |
| *G02B 5/30* | (2006.01) |

(52) U.S. Cl.
CPC ....... *C08G 18/7621* (2013.01); *C08G 77/045* (2013.01); *C08J 5/18* (2013.01); *C08J 7/042* (2013.01); *C08J 7/046* (2020.01); *C08K 7/22* (2013.01); *C08L 25/14* (2013.01); *C08L 51/08* (2013.01); *C09D 133/08* (2013.01); *G02B 1/12* (2013.01); *G02B 1/14* (2015.01); *G02B 5/305* (2013.01); *B82Y 30/00* (2013.01); *C08J 2367/02* (2013.01); *C08J 2367/03* (2013.01); *C08J 2435/02* (2013.01); *C08J 2475/06* (2013.01); *C08J 2483/04* (2013.01); *C08K 3/36* (2013.01); *C08K 7/26* (2013.01); *C08K 2201/011* (2013.01)

(58) Field of Classification Search
CPC .... C08J 7/042; C08J 2367/02; C08J 2367/03; C08J 2435/02; C08J 2475/06; C08J 2483/04; C08F 283/006; C08G 18/673; C08G 18/7621; C08G 77/045; C08K 7/22; C08K 3/36; C08K 7/26; C08K 2201/011; C08L 25/14; C08L 51/08; C09D 133/08; B82Y 30/00
See application file for complete search history.

(56) References Cited

U.S. PATENT DOCUMENTS

| | | | | |
|---|---|---|---|---|
| 9,069,197 | B2 | 6/2015 | Kuroda et al. | |
| 9,250,371 | B2 * | 2/2016 | Won | C09K 19/60 |
| 9,995,953 | B2 | 6/2018 | Kuroda et al. | |
| 10,042,194 | B2 | 8/2018 | Kuroda et al. | |
| 10,048,522 | B2 | 8/2018 | Kuroda et al. | |
| 10,409,105 | B2 | 9/2019 | Kuroda et al. | |
| 10,761,366 | B2 | 9/2020 | Kuroda et al. | |
| 2004/0247918 | A1 | 12/2004 | Hashimoto | |
| 2006/0052565 | A1 * | 3/2006 | Yoshioka | G02B 1/111 |
| | | | | 428/447 |
| 2007/0134459 | A1 * | 6/2007 | Hubert | B32B 37/00 |
| | | | | 428/40.1 |
| 2008/0044596 | A1 | 2/2008 | Fukagawa et al. | |
| 2009/0081447 | A1 | 3/2009 | Wakizaka et al. | |
| 2010/0222517 | A1 | 9/2010 | Hino et al. | |
| 2012/0200933 | A1 | 8/2012 | Akiyama et al. | |
| 2012/0321874 | A1 | 12/2012 | Shim et al. | |
| 2016/0062012 | A1 * | 3/2016 | Shin | G02B 5/3033 |
| | | | | 428/1.31 |
| 2016/0077239 | A1 * | 3/2016 | Asahi | G02B 1/14 |
| | | | | 359/601 |
| 2016/0368252 | A1 * | 12/2016 | Sargeant | B29C 55/12 |
| 2018/0194912 | A1 * | 7/2018 | Kim | G02B 1/11 |
| 2018/0217297 | A1 * | 8/2018 | Kim | C08J 7/043 |
| 2018/0230316 | A1 | 8/2018 | Kim et al. | |
| 2018/0299710 | A1 | 10/2018 | Kuroda et al. | |
| 2018/0313978 | A1 | 11/2018 | Chang et al. | |
| 2019/0004214 | A1 * | 1/2019 | Kim | C09D 7/65 |
| 2019/0016863 | A1 * | 1/2019 | Washio | B32B 27/08 |
| 2019/0101670 | A1 | 4/2019 | Byun et al. | |
| 2019/0146280 | A1 | 5/2019 | Murata et al. | |
| 2019/0154882 | A1 | 5/2019 | Byun et al. | |
| 2019/0154883 | A1 | 5/2019 | Byun et al. | |
| 2019/0170907 | A1 | 6/2019 | Byun et al. | |
| 2020/0241173 | A1 * | 7/2020 | Byun | G02B 1/11 |
| 2020/0319378 | A1 | 10/2020 | Seo et al. | |
| 2020/0348450 | A1 * | 11/2020 | Byun | C08K 7/22 |
| 2021/0206935 | A1 * | 7/2021 | Byun | C08G 18/7621 |
| 2021/0223438 | A1 * | 7/2021 | Baek | G02B 1/14 |
| 2021/0309863 | A1 * | 10/2021 | Byun | C09D 7/70 |
| 2021/0355354 | A1 * | 11/2021 | Yamamoto | B32B 7/12 |

FOREIGN PATENT DOCUMENTS

| | | | | | |
|---|---|---|---|---|---|
| CN | 107921757 | A | | 4/2018 | |
| CN | 108367560 | A | | 8/2018 | |
| CN | 108431639 | A | | 8/2018 | |
| DE | 102012112739 | A1 | | 4/2014 | |
| EP | 3287817 | A1 | | 2/2018 | |
| EP | 3315305 | A1 | | 5/2018 | |
| JP | S62-197424 | A | | 9/1987 | |
| JP | 2002-079616 | A | | 3/2002 | |
| JP | 2005-014584 | A | | 1/2005 | |
| JP | 2005-196122 | A | | 7/2005 | |
| JP | 2006-324059 | A | | 11/2006 | |
| JP | 2007241661 | A | * | 9/2007 | .......... G06F 3/1208 |
| JP | 2009-098658 | A | | 5/2009 | |
| JP | 2009-237097 | A | | 10/2009 | |
| JP | 4475016 | B2 | | 6/2010 | |
| JP | 2011-053271 | A | | 3/2011 | |
| JP | 2011-102977 | A | | 5/2011 | |
| JP | 2013-076841 | A | | 4/2013 | |
| JP | 5519217 | B2 | | 6/2014 | |
| JP | 2015-129936 | A | | 7/2015 | |
| JP | 2015-143758 | A | | 8/2015 | |
| JP | 2017-194620 | A | | 10/2017 | |
| JP | 6226762 | B2 | | 11/2017 | |
| JP | 2017-219861 | A | | 12/2017 | |
| JP | 2018-521195 | A | | 8/2018 | |
| JP | 2018-524641 | A | | 8/2018 | |
| JP | 2018-525667 | A | | 9/2018 | |
| JP | 2021-509973 | A | | 4/2021 | |
| KR | 20100121281 | A | * | 11/2010 | |
| KR | 20130010330 | A | * | 1/2013 | |
| KR | 10-2014-0047548 | A | | 4/2014 | |
| KR | 10-2015-0003709 | A | | 1/2015 | |
| KR | 10-2015-0078276 | A | | 7/2015 | |
| KR | 10-2016-0028594 | A | | 3/2016 | |
| KR | 10-2017-0031640 | A | | 3/2017 | |
| KR | 10-2017-0036624 | A | | 4/2017 | |
| KR | 10-1730855 | B1 | | 4/2017 | |
| KR | 10-2017-0082918 | A | | 7/2017 | |
| KR | 10-2017-0095923 | A | | 8/2017 | |
| KR | 10-2018-0008261 | A | | 1/2018 | |
| KR | 10-2018-0013786 | A | | 2/2018 | |
| KR | 10-2018-0018365 | A | | 2/2018 | |
| KR | 10-2018-0034061 | A | | 4/2018 | |
| KR | 10-2018-0043687 | A | | 4/2018 | |
| KR | 10-2018-0086027 | A | | 7/2018 | |
| KR | 10-2019-0003441 | A | | 1/2019 | |
| TW | 201312217 | A | | 3/2013 | |
| TW | 201407185 | A | | 2/2014 | |
| TW | 201809034 | A | | 3/2018 | |
| WO | 2009-038142 | A1 | | 3/2009 | |
| WO | 2012147527 | A1 | | 11/2012 | |
| WO | 2012157663 | A1 | | 11/2012 | |
| WO | 2016-068102 | A1 | | 5/2016 | |
| WO | 2017065148 | A1 | | 4/2017 | |

(56) References Cited

FOREIGN PATENT DOCUMENTS

| WO | 2017-078428 A1 | 5/2017 |
|----|----------------|--------|
| WO | 2017-142035 A1 | 8/2017 |
| WO | 2017-155336 A1 | 9/2017 |
| WO | 2017221885 A1 | 12/2017 |
| WO | 2018012802 A1 | 1/2018 |
| WO | 2018-110625 A1 | 6/2018 |
| WO | 2018181653 A1 | 10/2018 |

OTHER PUBLICATIONS

Extended European Search Report dated Jul. 2, 2021, of the corresponding European Patent Application No. 19873266.1, 8 pages.

Extended European Search Report dated Feb. 24, 2021, of the corresponding European Patent Application No. 19873013.7, 11 pages.

Hayakawa et al., "Studies on Double Orientation and Crystal Modifications of Stretched Polyester Films," Kobunshi Ronbunshu, Dec. 2009, vol. 66, No. 12, pp. 598-604, with English abstract.

Search Report issued for International Application No. PCT/KR2019/013680 on Feb. 6, 2020, 4 pages.

Search Report issued for International Application No. PCT/KR2019/013679 on Feb. 6, 2020, 2 pages.

The 117th Plastic Film Study Group, Exploring the Possibilities of Polymer Films, 2018, The Society of Polymer Science, Japan, with partial English translation, 4 pages.

Research Group on Plastic Films, retrieved from <https://main.spsj.or.jp/c12/gyoji/film.php> on Feb. 15, 2023, with partial English translation, 4 pages.

Kunisuke Sakamoto, Relationship between film orientation and mechanical properties by a new scale, Kobunshi Ronbunshu, vol. 48, No. 3, pp. 181-184, Mar. 1991, with partial English translation, 6 pages.

Cosmo Shine SRF, Toyobo, retrieved from <https://www.toyobo.co.jp/products/ind_film/optics/cosmoshine_srf/index.html> on Apr. 29, 2022, with partial English translation, 3 pages.

Y. Sasaki, Super Retardation Film "COSMOSHINE SRF®," (online), Oct. 13, 2015, Display Innovation China 2015, Beijing Summit, 9 pages.

Highly transparent and adherent film COSMOSHINE, 2011, retrieved from Internet Archive https://web.archive.org/web/20171025045707/http://www.toyobo.co.jp:80/seihin/film/kogyo/list/optics/index.html on Jan. 11, 2024, 5 pages.

Miyasaka, "Structure and Physical Properties of Plastics Films," One-axis extension and two-axis extension, Sen-i Gakkaishi, 1985, vol. 41, No. 9, pp. 285-289, 11 pages with English abstract.

"Thin film reflectance simulation," FILMETRICS, 2018, retrieved from Internet Archive http://web.archive.org/web/20181015180132/http://www.filmetricsinc.jp/reflectance-calculator on Dec. 29, 2023, 4 pages.

Sakaguchi et al., Assessment of Crystalline and Noncrystalline Orientations of Stretched Poly (Ethylene Terephthalate), Sen-I Gakkaishi, 1977, vol. 33, No. 10, pp. 499-508, with English abstracts, 15 pages.

Sakurada et al, Experimental Determination of Elastic Moduli of the Crystalline Regions in the Direction Perpendicular to the Chain Axis in Oriented Polymers, Kobunshi Kagaku, 1969 vol. 26 Issue 296 pp. 823-832, with English abstract, 13 pages.

Suzuki et al., Recent Development of Film Materials for Flat Panel Display : Focusing to Polyester Film for Polarizing Plate; ITD Technical Report, 2016, vol. 40, No. 13, pp. 1-5, with English abstract, 9 pages.

Toyobo Co., Ltd., Cosmoshine SRF; retrieved from http://www.toyobo.co.jp/products/ind_film/optics/cosmoshine_srf/index.html. on Nov. 10, 2024, 4 pages.

Chapter Eight: Stretched film molding, Industrial Research Association Encyclopedia, Mar. 24, 1997, pp. 374-388.

Retardation and birefringence, Oji Scientific Instruments, retrieved from URL: https://oji-keisoku.co.jp/cms/uploads/kobra_tech.pdf, on Nov. 10, 2024, 74 pages.

Takaya, Akihiro, Optical lectures for plastics processing engineers, Chapter 3 Uses and Applications 3.1 Zero-zero birefringence polymers, Lectures—Optical Lectures for Plastics Molding Engineers, 2016, vol. 28, No. 6, pp. 228-231, 8 pages.

Miyasaka, Keizo, Microstructure and properties of polymer films, Fiber Society, 1985, vol. 41, No. 9, pp. 285-289, 22 pages.

* cited by examiner

【FIG. 1】
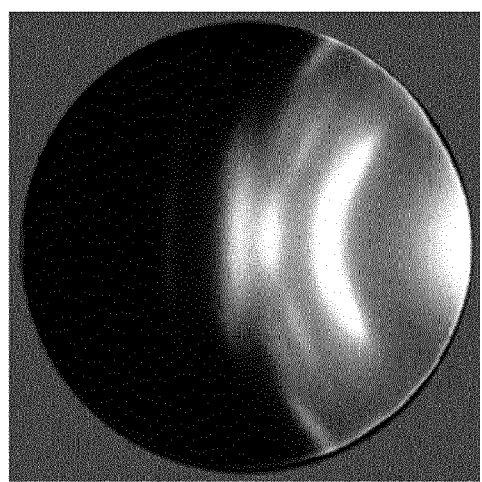
【FIG. 2】
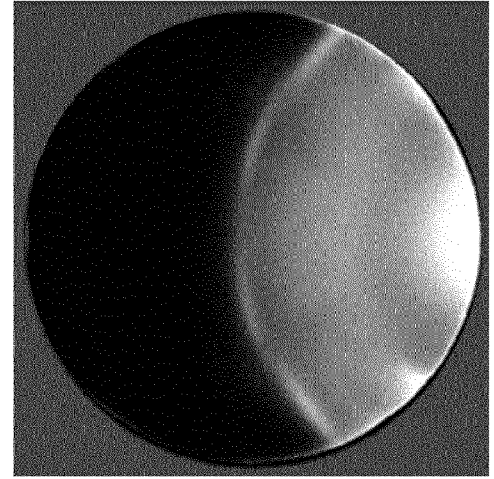

【FIG. 3】
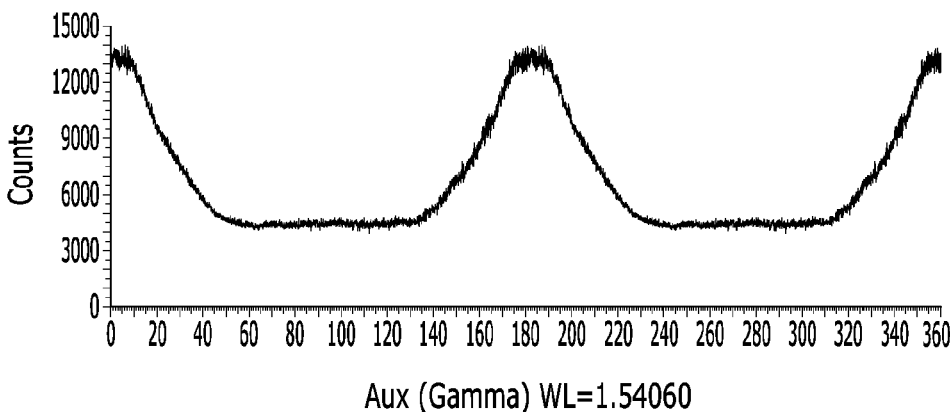
Aux (Gamma) WL=1.54060
【FIG. 4】
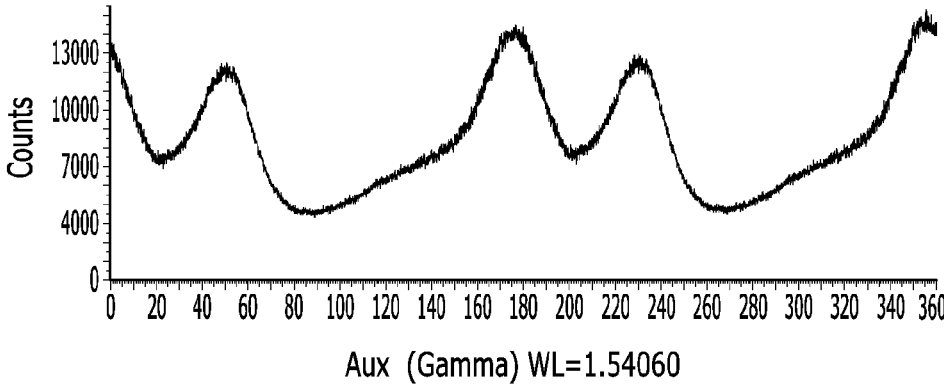
Aux (Gamma) WL=1.54060

ANTI-REFLECTIVE FILM, POLARIZING PLATE, AND DISPLAY APPARATUS

CROSS-REFERENCE TO RELATED APPLICATION(S)

This application is a 35 U.S.C. 371 National Phase Entry Application from PCT/KR2019/013680 filed on Oct. 17, 2019, designating the United States, which claims the benefit of Korean Patent Application No. 10-2018-0123703 filed on Oct. 17, 2018, Korean Patent Application No. 10-2018-0123704 filed on Oct. 17, 2018, Korean Patent Application No. 10-2019-0128927 filed on Oct. 17, 2019, and Korean Patent Application No. 10-2019-0128928 filed on Oct. 17, 2019 with the Korean Intellectual Property Office, the disclosures of which are herein incorporated by reference in their entirety.

FIELD OF THE INVENTION

The present invention relates to an anti-reflective film, a polarizing plate, and a display apparatus.

BACKGROUND OF THE INVENTION

In general, in flat panel display devices such as PDP, LCD, etc., an anti-reflective film is installed so as to minimize the reflection of incident light from the outside. Methods for minimizing the reflection of light include a method of dispersing filler such as inorganic fine particles, etc. in resin, coating it on a substrate film, and forming unevenness (anti-glare: AG coating); a method of using light interference by forming plural layers having different refractive indexes on a substrate film (anti-reflective; AR coating), or a method of using them together, etc.

Among them, in the case of AG coating, although the absolute amount of reflected light is equivalent to common hard coatings, low reflection effect can be obtained by reducing the amount of light entering the eyes using light scattering through unevenness. However, since the AG coating has lowered screen sharpness due to the surface unevenness, recently, many studies are being progressed on AR coating.

As a film using the AR coating, those having a multi-layered structure in which a hard coating layer (high refractive index layer), low reflective index coating layer, etc. are stacked on a light transmitting substrate film are being commercialized. However, the existing anti-reflective film using AR coating has a problem in that reflectance deviation and light transmittance deviation are large according to the part of the film. And, since the method of forming plural layers separately conducts the processes of forming each layer, it has a disadvantage in that scratch resistance is lowered due to weak interlayer adhesion (interface adhesion).

And, previously, in order to improve scratch resistance of the low refractive index layer included in the anti-reflective film, a method of adding various particles of nanometer size (for example, silica, alumina, zeolite, etc.) was mainly attempted. However, in case nanometer-sized particles are used, it was difficult to simultaneously increase scratch resistance while lowering the reflectance of the low refractive layer, and due to the nanometer-sized particles, the anti-fouling property of the surface of the low refractive index layer was significantly deteriorated.

Accordingly, in order to reduce the absolute reflection amount of incident light from the outside, reduce reflectance deviation and light transmittance deviation according to the part of the film, and improve anti-fouling property as well as scratch resistance of the surface, many studies are being progressed, but the resulting property improvement degree is unsatisfactory.

BRIEF SUMMARY OF THE INVENTION

The present invention provides an anti-reflective film that has low reflectance deviation and light transmittance deviation, can simultaneously realize high scratch resistance and anti-fouling property, and can increase screen sharpness of a display apparatus.

The present invention also provides a polarizing plate comprising the above anti-reflective film.

The present invention further provides a display apparatus that comprises the above anti-reflective film and provides high screen sharpness.

An anti-reflective film is provided herein, which comprises a low moisture permeable polymer film; a hard coating layer; and a low refractive index layer, wherein the mean of intervals between peaks is 160 to 200°, in an azimuthal angle distribution curve, calculated by azimuthal scan of diffraction pattern obtained by transmission mode X-ray diffraction (XRD), at $2\theta$ of 17 to 18°.

And, a polarizing plate comprising the above explained anti-reflective film is also provided herein.

And, a display apparatus comprising the above explained anti-reflective film is also provided herein.

DETAILED DESCRIPTION OF THE INVENTION

Hereinafter, an anti-reflective film, a polarizing plate and a display apparatus according to specific embodiments of the invention will be explained in more detail.

As used herein, a low refractive index layer may mean a layer having low refractive index, for example, a layer having refractive index of about 1.2 to 1.8 at the wavelength of 550 nm.

And, for specific measured quantities x and y, when the x value is changed and the y value is recorded according to the x value, if the maximum value (or extreme value) of the y appears, a peak means that part. The maximum value means the largest value in the peripheral part, and the extreme value means a value where instantaneous rate of change is 0.

And, hollow inorganic particles mean particles wherein an empty space exists on the surface and/or inside of the inorganic particles.

And, (meth)acryl includes both acryl and methacryl.

And, (co)polymer includes both copolymer and homopolymer.

And, a fluorine-containing compound means a compound comprising at least one fluorine atom in the compound.

As used herein, a photopolymerizable compound commonly designates a polymer compound that is polymerized by the irradiation of light, for example, by the irradiation of visible rays or ultraviolet rays.

According to one embodiment of the invention, an anti-reflective film comprising a low moisture permeable polymer film; a hard coating layer; and a low refractive index layer, wherein the mean of intervals between peaks is 160 to 200°, in the azimuthal angle distribution curve, calculated by azimuthal scan of diffraction pattern obtained by transmission mode X-ray diffraction (XRD), at $2\theta$ of 17 to 18°, is provided. The mean of intervals between peaks means the arithmetic mean of intervals between peaks in the azimuthal angle distribution curve in the range of 0 to 360°.

The present inventors progressed studies on an anti-reflective film, confirmed through experiments that an anti-reflective film wherein the mean of intervals between peaks is 160 to 200°, in the azimuthal angle distribution curve, calculated by azimuthal scan of diffraction pattern obtained by transmission mode X-ray diffraction (XRD), at 2θ of 17 to 18°, exhibits similar reflectance and light transmittance through the whole anti-reflective film, and thus, has small reflectance deviation and light transmittance deviation, can simultaneously realize high scratch resistance and anti-fouling property, and has screen sharpness of a display apparatus, and completed the present invention.

The anti-reflective film has small reflectance deviation and light transmittance deviation through the whole film, and thus, can increase screen sharpness of a display apparatus, and has excellent scratch resistance and high anti-fouling property, and thus, can be easily applied for the manufacturing process of a display apparatus or a polarizing plate, and the like, without specific limitations.

The X-ray diffraction pattern can be obtained using a transmission mode, among X-ray diffraction modes, and specifically, X-ray enters into a measurement subject, and then, scattered by the atomic layer in the crystals of the measurement subject, thus obtaining X-ray diffraction pattern. Through the X-ray diffraction pattern, the crystalline structure of material can be confirmed, and qualitative analysis can be made.

And, by azimuthal scan of the X-ray diffraction pattern obtained from the anti-reflective film according to one embodiment, at 2θ of 17 to 18°, the azimuthal angle distribution curve can be calculated.

In the azimuthal angle distribution curve calculated from the hard coating film according to one embodiment, the mean of intervals between peaks may be 160 to 200°, 165 to 195°, 170 to 190° or 175 to 185°.

And, 3 or more peaks may appear in the azimuthal angle distribution curve, and the mea of intervals between 3 or more peaks may be 160 to 200°, 165 to 195°, 170 to 190° or 175 to 185°. The mean of intervals between peaks is the arithmetic mean of intervals between peaks in the azimuthal angle distribution curve in the range of 0 to 360°.

As the mean of intervals between peaks fulfills the above explained range, similar reflectance and light transmittance may be exhibited through the whole anti-reflective film, thus realizing an anti-reflective film having low reflectance deviation and light transmittance deviation, and improving scratch resistance or anti-fouling property.

Meanwhile, the incident angle (θ) means an angle made by a crystal plane and X-ray, when X-ray is irradiated to a specific crystal plane, and the diffraction peak means a point where the first derivative (gradient of tangent line, dy/dx) is 0, where the first derivative (gradient of tangent line, dy/dx) of the y-axis of diffraction intensity to the x-axis of 2θ value changes from positive to negative, as the x-axis of 2 times (2θ) of the incident angle of entering X-ray increases in a positive direction, in a graph wherein the x-axis of the x-y plane is 2 times (2θ) of the incident angle of entering X-ray, and the y-axis of x-y plane is diffraction intensity.

Meanwhile, the diffraction peak means a peak of which full width at half maximum is 5° or more in the azimuthal angle distribution curve. A peak having full width at half maximum less than 5° corresponds to noise.

The mean of intervals between peaks in the azimuthal angle distribution curve may result from the crystalline state of polymer and the uniformity of crystal direction of polymer in the low moisture permeable polymer film.

Specifically, the polymer crystals in the low moisture permeable polymer film is observed in transmission mode X-ray diffraction (XRD) pattern, and more specifically, a (010) crystal plane in the low moisture permeable polymer film may be shown as a peak at 2θ of 17 to 18°.

And, the uniformity of polymer crystal direction in the low moisture permeable polymer film may be shown as intervals between peaks in the azimuthal angle distribution curve calculated by azimuthal scan at 2θ of 17 to 18°, and for example, the intervals between peaks may be 160° to 200°.

The low refractive index layer may comprise binder resin, and inorganic nanoparticles dispersed in the binder resin.

Meanwhile, the binder resin may comprise (co)polymer of photopolymerizable compounds. The photopolymerizable compound forming the binder resin may include monomers or oligomers comprising vinyl groups or (meth)acrylate. Specifically, the photopolymerizable compound may include monomers or oligomers comprising 1 or more, or 2 or more, or 3 or more vinyl groups or (meth)acrylate.

As specific examples of the monomers or oligomers comprising (meth)acrylate, pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylol propane tri(meth)acrylate, trimethylolpropane polyethoxy tri(meth)acrylate, trimethylolpropane trimethacrylate, ethyleneglycol dimethacrylate, butanediol dimethacrylate, hexaethyl methacrylate, butyl methacrylate or mixtures of two or more kinds thereof, or urethane modified acrylate oligomer, epoxide acrylate oligomer, ether acrylate oligomer, dendritic acrylate oligomer, or mixtures of two or more kinds thereof may be mentioned. The molecular weight of the oligomer may be 1,000 to 10,000.

As specific examples of the monomers or oligomers comprising vinyl groups, divinyl benzene, styrene or param-ethyl styrene may be mentioned.

Although the content of a part derived from the photopolymerizable compounds in the binder resin is not significantly limited, considering the mechanical properties of the finally prepared low refractive index layer or anti-reflective film, the content of the photopolymerizable compounds may be 10 wt % to 80 wt %, 15 to 70 wt %, 20 to 60 wt %, or 30 to 50 wt %. If the content of the photopolymerizable compounds is less than 10 wt %, scratch resistance or anti-fouling property of the low refractive index layer may be significantly deteriorated, and if it exceeds 80 wt %, reflectance may increase.

Meanwhile, the binder resin may further comprise cross-linked polymer of a photopolymeriazble compound, a fluorine-containing compound comprising a photoreactive functional group, and polysilsesquioxane substituted with one or more reactive functional groups.

Due to the properties of the fluorine atom included in the fluorine-containing compound comprising a photoreactive functional group, the interaction energy of the anti-reflective film with liquids or organic substances may be lowered, and thus, the amount of pollutants transferred to the anti-reflective film may be reduced, transferred pollutants may be prevented from remaining on the surface, and pollutants themselves may be easily removed.

And, in the process of forming the low refractive index layer and anti-reflective film, the reactive functional group included in the fluorine-containing compound comprising a photoreactive functional group may act as crosslink, thereby increasing physical durability, scratch resistance and thermal stability of the low refractive index layer and anti-reflective film.

In the fluorine-containing compound comprising a photoreactive functional group, one or more photoreactive functional groups may be included or substituted, and the photoreactive functional group means a functional group capable of participating in a polymerization reaction by the irradiation of light, for example, by the irradiation of visible rays or ultraviolet rays. The photoreactive functional group may include various functional groups capable of participating in a polymerization reaction by the irradiation of light, and specific examples thereof may include a (meth) acrylate group, an epoxide group, a vinyl group or a thiol group.

The fluorine-containing compound comprising a photoreactive functional group may have weight average molecular weight (weight average molecular weight converted in terms of polystyrene, measured by GPC) of 2,000 to 200,000, preferably 5,000 to 100,000.

If the weight average molecular weight of the fluorine-containing compound comprising a photoreactive functional group is too small, the fluorine-containing compounds may not be uniformly and effectively arranged on the surface of the low refractive index layer but be positioned inside, and thus, the anti-fouling property of the surface of the low refractive index layer and anti-reflective film may be deteriorated, and the crosslinking density inside of the low refractive index layer and anti-reflective film may be lowered, and thus, mechanical properties such as overall strength or scratch resistance, and the like may be deteriorated. And, if the weight average molecular weight of the fluorine-containing compound comprising a photoreactive functional group is too high, haze of the low refractive index layer and anti-reflective film may increase, or light transmittance may decrease, and the strength of the low refractive index layer and anti-reflective film may be also deteriorated.

Specifically, the fluorine-containing compound comprising a photoreactive functional group may be one or more selected from the group consisting of i) aliphatic compounds or alicyclic compounds substituted with one or more photoreactive functional groups, in which at least one carbon is substituted with one or more fluorine atoms; ii) heteroaliphatic compounds or heteroalicyclic compounds substituted with one or more photoreactive functional groups, in which at least one hydrogen is substituted with fluorine, and at least one carbon is substituted with silicon; iii) polydialkyl siloxane-based polymer substituted with one or more photoreactive functional groups, in which at least one silicon is substituted with one or more fluorine atoms (for example, polydimethylsiloxane-based polymer); iv) polyether compounds substituted with one or more photoreactive functional groups, in which at least one hydrogen is substituted with fluorine.

The crosslinked polymer may comprise, based on 100 parts by weight of parts derived from the photopolymerizable compound, 1 to 300 parts by weight, 2 to 250 parts by weight, 3 to 200 parts by weight, 5 to 190 parts by weight, or 10 to 180 parts by weight of parts derived from the fluorine-containing compound comprising a photoreactive functional group, If the fluorine-containing compound comprising a photoreactive functional group is excessively added compared to the photopolymerizable compound, the low refractive index layer may not have sufficient durability or scratch resistance. And, if the content of the fluorine-containing compound comprising a photoreactive functional group compared to on the photopolymerizable compound is too small, the low refractive index layer may not have sufficient mechanical properties such as anti-fouling property or scratch resistance, and the like.

The fluorine-containing compound comprising a photoreactive functional group may further comprise silicon or a silicon compound. Namely, the fluorine-containing compound comprising a photoreactive functional group may optionally contain silicon or a silicon compound inside, and specifically, the content of silicon in the fluorine-containing compound comprising a photoreactive functional group may be 0.1 to 20 wt %.

The content of silicon or a silicon compound included in the fluorine-containing compound comprising a photoreactive functional group may be confirmed by a commonly known analysis method, for example, ICP [Inductively Coupled Plasma] analysis.

The silicon included in the fluorine-containing compound comprising a photoreactive functional group may increase compatibility with other components included in the low refractive index layer, thereby preventing generation of haze in the finally prepared low refractive index layer and increasing transparency, and may improve slip property of the surface of the finally prepared low refractive index layer or anti-reflective film to increase scratch resistance.

Meanwhile, if the content of silicon in the fluorine-containing compound comprising a photoreactive functional group becomes too large, the low refractive index layer or anti-reflective film may not have sufficient light transmittance or anti-reflection performance, and anti-fouling property of the surface may be also deteriorated.

Meanwhile, the polysilsesquioxane substituted with one or more reactive functional groups may increase mechanical properties, for example, scratch resistance of the low refractive index layer due to the reactive functional groups existing on the surface, and contrary to the case of using previously known fine particles such as silica, alumina, zeolite, and the like, it may improve alkali resistance of the low refractive index layer, and improve average reflectance or appearance property such as color, and the like.

The polysilsesquioxane may be written as $(RSiO_{1.5})_n$ (wherein, n is 4 to 30 or 8 to 20), and it may have various structures such as a random structure, a ladder type, a cage and a partial cage, and the like. For example, in order to increase the properties and quality of the low refractive index layer and anti-reflective film, as the polysilsesquioxane substituted with one or more reactive functional groups, polyhedral oligomeric silsesquioxane substituted with one or more reactive functional groups and having a cage structure may be used.

And, for example, the polyhedral oligomeric silsesquioxane substituted with one or more reactive functional groups and having a cage structure may comprise 8 to 20 silicon atoms in the molecule.

And, at least one of the silicon atoms of the polyhedral oligomeric silsesquioxane having a cage structure may be substituted with a reactive functional group, and the silicon atoms not substituted with a reactive functional group may be substituted with the above-explained non-reactive functional groups.

Since at least one of the silicon atoms of the polyhedral oligomeric silsesquioxane having a cage structure is substituted with a reactive functional group, the mechanical properties of the low refractive index layer and the binder resin may be improved, and since remaining silicon atoms are substituted with non-reactive functional groups, steric hindrance appears to significantly decrease the frequency or probability of siloxane bonds (—Si—O—) being exposed outside, thereby improving alkali resistance of the low refractive index layer and the binder resin.

The reactive functional group substituted at polysilsesquioxane may include one or more functional groups selected from the group consisting of alcohol, amine, carboxylic acid, epoxide, imide, (meth)acrylate, nitrile, norbornene, olefin(allyl, cycloalkenyl or vinyldimethylsilyl, and the like), polyethyleneglycol, thiol and vinyl groups, preferably, epoxide or (meth)acrylate.

As specific examples of the reactive functional groups, (meth)acrylate, C1-20 alkyl (meth)acrylate, C3-20 cycloalkyl epoxide, C1-10 alkyl cycloalkane epoxide may be mentioned. The alkyl (meth)acrylate means that another part of 'alkyl' that is not bonded with (meth)acrylate is a bonding position, the cycloalkyl epoxide means that another part of tycloalkyr that is not bonded with epoxide is a bonding position, and the alkyl cycloalkane epoxide means that another part of 'alkyl' that is not bonded with cycloalkane epoxide is a bonding position.

Meanwhile, the polysilsesquioxane substituted with one or more reactive functional groups may further comprise one or more non-reactive functional groups selected from the group consisting of a C1-20 linear or branched alkyl group, a C6-20 cyclohexyl group and a C6-20 aryl group, in addition to the above explained reactive functional groups. Since reactive functional groups and non-reactive functional groups are substituted on the surface of the polysilsesquioxane, in the polysilsesquioxane substituted with one or more reactive functional groups, siloxane bonds (—Si—O) may be positioned inside of the molecule without being exposed outside, thereby further increasing alkali resistance and scratch resistance of the low refractive index layer and anti-reflective film.

As examples of the polyhedral oligomeric silsesquioxane (POSS) substituted with one or more reactive functional groups and having a cage structure, POSS substituted with one or more alcohol such as TMP diollsobutyl POSS, cyclohexanediol isobutyl POSS, 1,2-propanediollsobutyl POSS, octa(3-hydroxy-3 methylbutyldimethylsiloxy) POSS, and the like; POSS substituted with one or more amine such as aminopropyllsobutyl POSS, aminopropyllsooctyl POSS, aminoethylaminopropyl isobutyl POSS, N-phenylaminopropyl POSS, N-methylaminopropyl isobutyl POSS, octaammonium POSS, aminophenyl cyclohexyl POSS, aminophenyl isobutyl POSS, and the like; POSS substituted with one or more carboxylic acid such as maleamic acid-cyclohexyl POSS, maleamic acid-isobutyl POSS, octa maleamic acid POSS, and the like; POSS substituted with one or more epoxide such as epoxy cyclohexyl isobutyl POSS, epoxy cyclohexyl POSS, glycidyl POSS, glycidylethyl POSS, glycidylisobutyl POSS, glycidylisooctyl POSS, and the like; POSS substituted with one or more imide such as POSS maleimide cyclohexyl, POSS maleimide isobutyl, and the like; POSS substituted with one or more (meth)acrylate such as acrylolsobutyl POSS, (meth)acryl isobutyl POSS, (meth)acrylate cyclohexyl POSS, (meth)acrylate isobutyl POSS, (meth)acrylate ethyl POSS, (meth)acryl ethyl POSS, (meth)acrylate isooctyl POSS, (meth)acryl isooctyl POSS, (meth)acryl phenyl POSS, (meth)acryl POSS, acrylo POSS, and the like; POSS substituted with one or more nitrile groups such as cyanopropyllsobutyl POSS, and the like; POSS substituted with one or more norbornene groups such as norbornenyl ethyl ethyl POSS, norbornenyl ethyl isobutyl POSS, norbornenyl ethyl disilanoisobutyl POSS, trisnorbornenyl isobutyl POSS, and the like; POSS substituted with one or more vinyl groups such as allyl isobutyl POSS, monovinylisobutyl POSS, octacyclohexenyldimethylsilyl POSS, octavinyldimethylsilyl POSS, octavinyl POSS, and the like; POSS substituted with one or more olefin such as allylisobutyl POSS, monovinylisobutyl POSS, octacyclohexenyldimethylsilyl POSS, octavinyldimethylsilyl POSS, octavinyl POSS, and the like; POSS substituted with C5-30 PEG; POSS substituted with one or more thiol groups such as mercaptopropyllsobutyl POSS or mercaptopropyllsooctyl POSS, and the like, may be mentioned.

The crosslinked polymer of a photopolymeriazble compound, a fluorine-containing compound comprising a photoreactive functional group, and polysilsesquioxane substituted with one or more reactive functional groups may comprise, based on 100 parts by weight of the photopolymeriazble compound, 0.5 to 60 parts by weight, 1.5 to 45 parts by weight, 3 to 40 parts by weight, or 5 to 30 parts by weight of the polysilsesquioxane substituted with one or more reactive functional groups.

If the content of parts derived from the polysilsesquioxane substituted with one or more reactive functional groups compared to parts derived from the photopolymeriazble compound in the binder resin is too small, it may be difficult to sufficiently secure scratch resistance of the low refractive index layer. And, if the content of parts derived from the polysilsesquioxane substituted with one or more reactive functional groups compared to parts derived from the photopolymeriazble compound in the binder resin is too large, transparency of the low refractive index layer or anti-reflective film may be deteriorated, and scratch resistance may be deteriorated to the contrary.

Meanwhile, the inorganic fine particles mean inorganic particles having nanometer or micrometer sized diameters.

Specifically, the inorganic fine particles may include solid inorganic nanoparticles and/or hollow inorganic nanoparticles.

The solid inorganic nanoparticles mean particles having an average diameter of 100 nm or less, inside of which an empty space does not exist.

And, the hollow inorganic nanoparticles mean particles having an average diameter of 200 nm or less, on the surface and/or inside of which an empty space exists.

The solid inorganic nanoparticles may have an average diameter of 0.5 to 100 nm, 1 to 80 nm, 2 to 70 nm or 5 to 60 nm.

The hollow inorganic nanoparticles may have an average diameter of 1 to 200 nm, 10 to 150 nm, 20 to 130 nm, 30 to 110 nm or 40 to 100 nm.

Meanwhile, each of the solid inorganic nanoparticles and the hollow inorganic nanoparticles may include one or more reactive functional groups selected from the group consisting of a (meth)acrylate group, an epoxide group, a vinyl group and a thiol group on the surface. Since each of the solid inorganic nanoparticle and the hollow inorganic nanoparticle includes the above explained reactive functional groups on the surface, the low refractive index layer may have higher crosslinking density, thereby securing further improved scratch resistance and anti-fouling property.

As the hollow inorganic nanoparticles, nanoparticles coated with a fluorine-containing compound on the surface may be used alone, or in combination with hollow inorganic nanoparticles that are not coated with a fluorine-containing compound on the surface. If the surface of the hollow inorganic nanoparticles is coated with a fluorine-containing compound, surface energy may be further lowered, thereby further increasing durability or scratch resistance of the low refractive index layer.

As a method of coating a fluorine-containing compound on the surface of the hollow inorganic naoparticles, commonly known particle coating method or polymerization method may be used without specific limitations, and for example, the hollow inorganic nanoparticles and fluorine-containing compound may be subjected to a sol-gel reaction in the presence of water and a catalyst to bind the fluorine-containing compound on the surface of the hollow inorganic nanoparticles through hydrolysis and condensation reaction.

Specific examples of the hollow inorganic nanoparticles may include hollow silica particles. The hollow silica may comprise functional groups substituted on the surface so that it may be more easily dispersed in an organic solvent. Examples of the organic functional groups that can be substituted on the surface of the hollow silica particles are not significantly limited, and for example, a (meth)acrylate group, a vinyl group, a hydroxyl group, an amine group, an allyl group, an epoxy group, an isocyanate group, an amine group, or fluorine, and the like may be substituted on the surface of the hollow silica.

The binder resin of the low refractive index layer may comprise, based on 100 parts by weight of the photopolymerizable compound, 10 to 600 parts by weight of, 20 to 550 parts by weight of, 50 to 500 parts by weight of, 100 to 400 parts by weight of, or 150 to 350 parts by weight of the inorganic fine particles. If the inorganic fine particles are excessively added, due to decrease in the content of binder, scratch resistance or abrasion resistance of the coating film may be deteriorated.

Meanwhile, the low refractive index layer may be obtained by coating a photocurable coating composition comprising a photopolymerizable compound, a fluorine-containing compound comprising a reactive functional group, polysilsesquioxane substituted with one or more reactive functional groups, and the inorganic fine particles on the low moisture permeable polymer film, and photocuring the coated product.

And, the photocurable coating composition may further comprise a photoinitiator. Thus, in the low refractive index layer prepared from the above explained photocurable coating composition, the photopolymerization initiator may remain.

As the photopolymerization initiator, compounds known to be usable in a photocurable resin composition may be used without specific limitations, and specifically, a benzophenon-based compound, an acetophenon-based compound, a biimidazole-based compound, a triazine-based compound, an oxime-based compound or mixtures of two or more thereof may be used.

Based on 100 parts by weight of the photopolymerization compound, the photopolymerization initiator may be used in the content of 1 to 100 parts by weight, 5 to 90 parts by weight, 10 to 80 parts by weight, 20 to 70 parts by weight, or 30 to 60 parts by weight. If the amount of the photopolymerization initiator is too small, materials that are not-cured in the photocuring step and remain may be generated. If the amount of the photopolymerization initiator is too large, non-reacted initiator may remain as impurity or cross-linking density may decrease, and thus, the mechanical properties of the prepared film may be deteriorated or reflectance may be significantly increased.

And, the photocurable coating composition may further comprise an organic solvent. Non-limiting examples of the organic solvent may include ketones, alcohols, acetates and ethers, or mixtures of two or more kinds thereof.

As specific examples of the organic solvent, ketones such as methylethyl ketone, methyl isobutyl ketone, acetylac-etone or isobutyl ketone, and the like; alcohols such as methanol, ethanol, n-propanol, i-propanl, n-butanol, i-butanol or t-butanol, and the like; acetates such as ethyl acetate, i-propyl acetate, or polyethyleneglycol monomethylether acetate, and the like; ethers such as tetrahydrofuran or propyleneglycol monomethylether, and the like; mixtures of two or more kinds thereof may be mentioned.

The organic solvent may be added when mixing each component included in the photocurable coating composition, or it may be included in the photocurable coating composition while each component is dispersed or mixed in the organic solvent and added. If the content of the organic solvent in the photocurable coating composition is too small, flowability of the photocurable coating composition may be deteriorated to generate defects such as stripes in the finally prepared film. And, if the organic solvent is excessively added, solid content may decrease, and thus, coating and film formation may not be sufficiently achieved, and the properties or surface properties of the film may be deteriorated, and defects may be generated during drying and curing processes. Thus, the photocurable coating composition may comprise an organic solvent such that the total solid content concentration of the included components may become 1 wt % to 50 wt %, or 2 to 20 wt %.

Meanwhile, for the application of the photocurable coating composition, commonly used methods and apparatuses may be used without specific limitations, and for example, bar coating such as Meyer bar, etc., gravure coating, 2 roll reverse coating, vacuum slot die coating, 2 roll coating, etc. may be used.

In the step of photocuring the photocurable coating composition, UV or visible rays of 200-400 nm wavelength may be irradiated, and the exposure amount may be preferably 100 to 4,000 mJ/cm$^2$. The exposure time is not specifically limited, and may be appropriately changed according to the exposure apparatus used, the wavelength of irradiated light rays or exposure amount.

And, in the step of photocuring the photocurable coating composition, nitrogen purging, etc. may be conducted so as to apply nitrogen atmosphere condition.

Meanwhile, as the hard coating layer, commonly known hard coating layers may be used without specific limitations.

One example of the hard coating layer may include a hard coating layer comprising binder resin comprising photocurable resin; and organic or inorganic fine particles dispersed in the binder resin.

The photocurable resin included in the hard coating layer may be polymer of photocurable compounds capable of inducing a polymerization reaction if light such as UV, etc. is irradiated, commonly known in the art. Specifically, the photocurable resin may include one or more selected from the group consisting of: reactive acrylate oligomers such as urethane acrylate oligomer, epoxide acrylate oligomer, polyester acrylate, and polyether acrylate; and multifunctional acrylate monomers such as dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol acrylate, propoxylated glycerol triacrylate, tripropylene glycol diacrylate, and ethylene glycol diacrylate.

Although the particle diameter of the organic or inorganic fine particles is not specifically limited, for example, the organic fine particles may have a particle diameter of 1 to 10 μm, and the inorganic fine particles may have a particle diameter of 1 nm to 500 nm, or 1 nm to 300 nm. The particle diameter of the organic or inorganic fine particles may be defined as a volume average particle diameter.

And, although examples of the organic or inorganic fine particles included in the hard coating film are not specifically limited, for example, the organic or inorganic fine particles may be organic fine particles selected from the group consisting of acryl-based resin, styrene-based resin, epoxide resin and nylon resin, or inorganic fine particles selected from the group consisting of silicon oxide, titanium dioxide, indium oxide, tin oxide, zirconium oxide and zinc oxide.

The binder resin of the hard coating layer may further comprise high molecular weight (co)polymer having a number average molecular weight of 10,000 or more. 13,000 or more, 15,000 to 100,000, or 20,000 to 80,000. The high molecular weight (co)polymer may be one or more selected from the group consisting of cellulose-based polymer, acryl-based polymer, styrene-based polymer, epoxide-based polymer, nylon-based polymer, urethane-based polymer, and polyolefin-based polymer.

Meanwhile, another example of the hard coating layer may include a hard coating layer comprising organic polymer resin of photocurable resin; and an antistatic agent dispersed in the organic polymer resin.

The antistatic agent may be a quaternary ammonium salt compound; a pyridinium salt; a cationic compound having 1 to 3 amino groups; an anionic compound such as sulfonic acid base, sulfuric ester base, phorphoric ester base, phosphonic acid base, and the like; an amphoteric compound such as an amino acid-based or an amino sulfuric ester-based compound, and the like; a non-ionic compound such as an imino alcohol-based compound, a glycerine-based compound, a polyethylene glycol-based compound, and the like; an organometallic compound such as a metal alkoxide compound including tin or titanium, and the like; a metal chelate compound such as an acetylacetonate salt of the organometallic compound; a reaction product or polymerization product of two or more kinds thereof; a mixture of two or more kinds thereof. Here, the quaternary ammonium salt compound may be a compound having one or more quaternary ammonium salt groups in the molecule, and low molecular type or high molecular type may be used without limitations.

And, as the anti-static agent, conductive polymer and metal oxide fine particles may be also used. As the conductive polymer, aromatic conjugated poly(paraphenylene), heterocyclic conjugated polypyrrole, polythiophene, aliphatic conjugated polyacetylene, conjugated polyaniline containing hetero atoms, mixed type conjugated poly(phenylene vinylene), double chain type conjugated compounds having multiple conjugated chains in the molecule, conductive composites wherein conjugated polymer chains are grafted or block-polymerized to saturated polymer, and the like may be mentioned. And, as the metal oxide fine particles, zinc oxide, antimony oxide, tin oxide, cerium oxide, indium tin oxide, indium oxide, aluminum oxide, antimony doped tin oxide, aluminum doped zinc oxide, and the like may be mentioned.

The hard coating layer comprising organic polymer resin of photopolymerizable resin; and an anti-static agent dispersed in the organic polymer resin may further comprise one or more compounds selected from the group consisting of alkoxy silane-based oligomer and metal alkoxide-based oligomer.

Although the alkoxy silane-based compound may be one commonly used in the art, for example, it may be one or more compounds selected form the group consisting of tetramethoxysilane, tetraethoxysilane, tetraisopropoxysilane, methyltrimethoxysilane, methyltriethoxysilane, methacryloxypropyltrimethoxysilane, glycidoxy propyl trimethoxy silane, and glycidoxy propyl triethoxy silane.

And, the metal alkoxide-based oligomer may be prepared by the sol-gel reaction of a composition comprising a metal alkoxide-based compound and water. The sol-gel reaction may be conducted by a method similar to the above explained preparation method of alkoxy silane-based oligomer. However, since the metal alkoxide-based compound may rapidly react with water, the sol-gel reaction may be conducted by diluting the metal alkoxide-based compound in an organic solvent, and then, slowly dropping water. At this time, considering the reaction efficiency, it is preferable that the mole ratio of the metal alkoxide-based compound to water (based on metal ions) is controlled within a range of 3 to 170.

Here, the metal alkoxide-based compound may be one or more compounds selected from the group consisting of titanium tetra-isopropoxide, zirconium isopropoxide and aluminum isopropoxide.

Meanwhile, the low moisture permeable film may be a transparent film having light transmittance of 90% or more, and haze of 1% or less.

The low moisture permeable film may be a polymer film having low moisture permeability in which moisture permeation, i.e., the movement of moisture from a place having high vapor pressure to a place having low vapor pressure, hardly occurs through the film, and for example, the low moisture permeable polymer film may have moisture permeability of 50 $g/m^2 \cdot day$ or less, 30 $g/m^2 \cdot day$ or less, 20 $g/m^2 \cdot day$ or less or 15 $g/m^2 \cdot day$ or less, under temperature of 30 to 40° C. and relative humidity of 90 to 100%. If the moisture permeability of the low moisture permeable polymer film is greater than 10 $g/m^2 \cdot day$, moisture may be permeated into the anti-reflective film, and thus, deterioration of a display applying the anti-reflective film may be generated under a high temperature environment.

As explained above, the mean of intervals between peaks in the azimuthal angle distribution curve may result from the crystalline state of polymer and crystal direction of polymer in the low moisture permeable polymer film.

And, the alignment degree of polymer crystals in the low moisture permeable polymer film may be related to a stretching ratio in the manufacturing process of a low moisture permeable polymer film, stretching temperature, cooling speed after stretching, and process temperature, and the like, and for example, since the alignment degree of polymer crystals in the low moisture permeable polymer film may be in disorder at high temperature, in order to prevent this, a process temperature may be controlled to 100° C. or less.

And, the alignment degree of polymer crystals in the low moisture permeable polymer film may be related to tensile strength ratio in one direction and a direction perpendicular to the one direction of the low moisture permeable polymer film.

Specifically, the low moisture permeable polymer film exhibits different tensile strength values in one direction and in a direction perpendicular to the one direction, and for example, a ratio of tensile strength in one direction to tensile strength in a direction perpendicular to the one direction, may be 2 or more, 2.1 to 20, 2.2 to 10, or 2.3 to 5. The tensile strength in a direction perpendicular to the one direction is smaller than the tensile strength in one direction. If the tensile strength ratio is less than 2, reflectance deviation and light transmittance deviation according to the part of the anti-reflective film may be large, and rainbow phenomenon due to the interference of UV may be generated.

The tensile strength in one direction may be tensile strength in MD (Machine Direction) or TD (Transverse Direction) of the low moisture permeable polymer film, and specifically, it may be 30 Mpa to 1 Gpa, 40 Mpa to 900 Mpa, or 50 Mpa to 800 Mpa.

The tensile strength perpendicular to the one direction may be tensile strength in MD or TD of the low moisture permeable polymer film, and specifically, it may be 30 Mpa to 1 Gpa, 40 Mpa to 900 Mpa, or 50 Mpa to 800 Mpa.

The low moisture permeable polymer film may have thickness direction retardation (Rth) measured at a wavelength of 550 nm, of 5,000 nm or more, 7,000 to 50,000 nm, or 8,000 to 40,000 nm. As specific examples of such low moisture permeable polymer film, a uniaxially stretched polyethylene terephthalate film or a biaxially stretched polyethylene terephthlate film may be mentioned.

If the thickness direction retardation (Rth) of the low moisture permeable polymer film is less than 5,000 nm, reflectance deviation and light transmittance deviation according to the part of the anti-reflective film may be large, and rainbow phenomenon due to the interference of UV may be generated.

The thickness direction retardation may be confirmed through commonly known measuring method and measuring apparatus. For example, as the measuring apparatus of thickness direction retardation, a product name AxoScan manufactured by AXOMETRICS Inc. may be mentioned.

For example, the thickness direction retardation (Rth) may be calculated by inputting the refractive index value (589 nm) of the light-transmitting substrate film in the measuring device, and then, measuring the thickness direction retardation of the light-transmitting substrate film using light of 590 nm wavelength under temperature of 25° C. and humidity of 40%, and converting it into a retardation value per a film thickness of 10 μm, based on the measured value of thickness direction retardation (value obtained by the automatic measurement (automatic calculation) of the measuring device). And, the size of the light-transmitting substrate is not specifically limited as long as it is larger than a sidelight part (diameter: about 1 cm) of the stage of the measuring device, but it may have a dimension of height 76 mm, width 52 mm and thickness 13 μm.

And, the value of ⌈refractive index of the light-transmitting substrate (589 nm)⌋ that is used for the measurement of thickness direction retardation (Rth) may be calculated by forming a non-stretched film comprising the same kind of a resin film to the light transmitting substrate that forms a film of which retardation is to be measured, and then, measuring refractive index to 589 nm light of the in-plane direction of a measuring sample (a direction vertical to the thickness direction), using the non-stretched film as a measuring sample (in case a film to be measured is a non-stretched film, the film itself may be used as a measurement sample), using a refractive measuring apparatus (product name ⌈NAR-1T SOLID⌋ manufactured by Atagoa Co., Ltd), using a light source of 589 nm, under temperature condition of 23° C.

And, the material of the low moisture permeable polymer film may be triacetylcellulose, cycloolef in polymer, polyacrylate, polycarbonate, polyethylene terephthalate, and the like. And, the thickness of the base film may be 10 to 300 μm considering productivity, and the like, but not limited thereto.

The anti-reflective film of one embodiment exhibits low reflectance, and thus, can realize high light transmittance and excellent optical properties. Specifically, the anti-reflective film may have an average reflectance of 2.0% or less, 1.6% or less, 1.2% or less, 0.05% to 0.9%, 0.10% to 0.70%, or 0.2% to 0.5%, in the wavelength region of 380 nm to 780 nm.

And, the anti-reflective film of one embodiment exhibits low reflectance deviation and light transmittance deviation, and thus, can realize excellent optical properties. Specifically, the average reflectance deviation of the anti-reflective film may be 0.2% p or less, 0.01 to 0.15% p or 0.01 to 0.1% p. And, the light transmittance deviation of the anti-reflective film may be 0.2% p or less, 0.01 to 0.15% p or 0.01 to 0.1% p.

The average reflectance deviation means a difference (absolute value) between each average reflectance in the wavelength region of 380 to 780 nm of two or more specific points selected in the anti-reflective film, and the mean of the average reflectances. Specifically, the average reflectance deviation may be calculated by 1) selecting two or more points in an anti-reflective film, 2) measuring each average reflectance at the two or more points, 3) calculating the arithmetic mean of the average reflectances measured in the step 2), and 4) calculating a difference (absolute value) between the average reflectance of each point and the arithmetic mean of step 3), thus finally calculating two or more average reflectance deviations. Among the two or more average reflectance deviations, the largest average reflectance deviation may be 0.2% p or less.

Meanwhile, the light transmittance deviation means a difference (absolute value) between each light transmittance of two or more specific points selected in the anti-reflective film, and the mean of the light transmittances, and the light transmittance deviation may be calculated by the same method as the method of calculating the average reflectance deviation, except that light transmittance is measured instead of average reflectance. Among the two or more light transmittance deviations, the largest light transmittance deviation may be 0.2% p or less.

According to another embodiment of the invention, a polarizing plate comprising the anti-reflective film according to the above embodiment is provided. The polarizing plate may comprise a polarizer and an anti-reflective film formed on at least one side of the polarizer.

The material and preparation method of the polarizing film are not specifically limited, and those commonly known in the art may be used. For example, the polarizer may be a polyvinylalcohol-based polarizer.

The polarizer and the anti-reflective film may be laminated by adhesive such as aqueous adhesive or non-aqueous adhesive, and the like.

According to yet another embodiment of the invention, a display apparatus comprising the above explained anti-reflective film is provided. Although specific examples of the display apparatus are not limited, for example, it may be a liquid crystal display, a plasma display apparatus, an organic light emitting diode, and the like.

For example, the display apparatus may be a liquid display apparatus comprising one pair of polarizing plates facing each other; a thin film transistor, a color filer and a liquid crystal cell sequentially stacked between the one pair of polarizing plates; and a backlight unit.

In the display apparatus, the anti-reflective film may be positioned at the side of an observer of a display panel or at the outermost surface of the backlight.

In the display apparatus comprising the anti-reflective film, an anti-reflective film may be positioned on one side of the polarizing plate relatively distant from the backlight unit, among the one pair of polarizing plates.

And, the display apparatus may comprise a display panel, a polarizer positioned on at least one side of the panel, and an anti-reflective film positioned on the opposite side.

Advantageous Effects

According to the present invention, an anti-reflective film that has low reflectance deviation and light transmittance deviation, can simultaneously realize high scratch resistance and anti-fouling property, and can increase screen sharpness of a display apparatus, a polarizing plate comprising the anti-reflective film, and a display apparatus comprising the anti-reflective film, are provided.

BRIEF DESCRIPTION OF THE DRAWINGS

FIG. 1 and FIG. 2 show transmission mode diffraction patterns of the anti-reflective film of Example 1.

FIG. 3 shows the azimuthal angle distribution curve calculated from the anti-reflective film of Example 1.

FIG. 4 shows the azimuthal angle distribution curve calculated from the anti-reflective film of Comparative Example 1.

DETAILED DESCRIPTION OF THE EMBODIMENTS

The present invention will be explained in detail in the following Examples. However, these examples are presented only as the illustrations of the present invention, and the scope of the present invention is not limited thereby.

Preparation Example 1: Preparation of a Coating Solution for Forming a Hard Coating Layer The components described in the following Table 1 were mixed to prepare coating solutions (B1, B2 and B3) for forming a hard coating layer.

TABLE 1

| (unit: g) | B1 | B2 | B3 |
|---|---|---|---|
| DPHA | — | 6.237 | — |
| PETA | 16.421 | 10.728 | 13.413 |
| UA-306T | 3.079 | 2.069 | 6.114 |
| 8BR-500 | 6.158 | 6.537 | 6.114 |
| IRG-184 | 1.026 | 1.023 | 1.026 |
| Tego-270 | 0.051 | 0.051 | 0.051 |
| BYK350 | 0.051 | 0.051 | 0.051 |
| 2-butanol | 25.92 | 32.80 | 36.10 |
| IPA | 45.92 | 38.80 | 35.70 |
| XX-103BQ(2.0 μm 1.515) | 0.318 | 0.460 | 0.600 |
| XX-113BQ(2.0 μm 1.555) | 0.708 | 0.563 | 0.300 |
| MA-ST(30% in MeOH) | 0.342 | 0.682 | 0.542 |

DPHA: dipentaerythritol hexaacrylate
PETA: pentaerythritol triacrylate
UA-306T: urethane acrylate, a reaction product of toluene diisocyante and pentaerythritol triacrylate (a product from Kyoeisha)
8BR-500: photocurable urethane acrylate polymer (Mw 200,000, a product from Taisei Fine Chemical)
IRG-184: initiator (Irgacure 184, a product from Ciba)
Tego-270: leveling agent (a product from Tego)
BYK350: leveling agent (a product from BYK)
IPA isopropyl alcohol
XX-103BQ (diameter: 2.0 μm, Refractive index: 1.515): copolymer particles of polystyrene and polymethyl methacrylate (a product from Sekisui Plastic)
XX-1136Q(diameter: 2.0 μm, Refractive index: 1.555): copolymer particles of polystyrene and polymethyl methacrylate (a product from Sekisui Plastic)
MA-ST (30% in MeOH): dispersion in which nanosilica particles having a size of 10~15 nm are dispersed in methyl alcohol (a product from Nissan Chemical)

Preparation Example 2-1: Preparation of a Coating Solution (C1) for Forming a Low Refractive Index Layer 100 g of trimethylolpropane triacrylate (TMPTA), 283 g of hollow silica nanoparticles (diameter range: about 42 nm to 66 nm, a product from JSC catalyst and chemicals), 59 g of solid silica nanoparticles (diameter range: about 12 nm to 19 nm), 115 g of a first fluorine-containing compound (X-71-1203M, ShinEtsu), 15.5 g of a second fluorine-containing compound (RS-537, DIC) and 10 g of an initiator (Irgacure 127, Ciba) were diluted in a solvent of MIBK (methyl isobutyl ketone) such that solid content concentration became 3 wt %, thus preparing a coating solution (a photocurable coating composition) for forming a low refractive index layer.

Preparation Example 2-2: Preparation of a Coating Solution (C2) for Forming a Low Refractive Index Layer 100 g of dipentaerythritol hexaacrylate (DPHA), 143 g of hollow silica nanoparticles (diameter range: about 51 nm to 72 nm, a product from JSC catalyst and chemicals), 29 g of solid silica nanoparticles (diameter range: about 12 nm to 19 nm), 56 g of a fluorine-containing compound (RS-537, DIC) and 3.1 g of an initiator (Irgacure 127, Ciba Company) were diluted in a solvent of MIBK (methyl isobutyl ketone) such that solid content concentration became 3.5 wt %, thus preparing a coating solution (a photocurable coating composition) for forming a low refractive index layer.

Examples and Comparative Examples: Preparation of Anti-Reflective Films

On each low moisture permeable polymer film (thickness 80 μm) described in the following Table 2, each coating solution (B1, B2, B3) for forming a hard coating layer prepared above was coated with #12 mayer bar, and then, dried at 60° C. for 2 minutes, and UV cured to form a hard coating layer (coating thickness 5 μm). As an UV lamp, H bulb was used, and a curing reaction was progressed under nitrogen atmosphere. The quantity of UV irradiated during curing was 100 mJ/cm$^2$.

On the hard coating layer, each coating solution (C1, C2) for forming a low refractive index layer was coated with #4 mayer bar to a thickness of about 110 to 120 nm, and dried at 40° C. for 1 minute and cured. During curing, UV was irradiated at 252 mJ/cm$^2$ to the dried coating solution under nitrogen purging.

TABLE 2

| | Anti-reflective film | | |
|---|---|---|---|
| | Tensile strength ratio* | Hard coating layer | Low refractive index layer |
| Example 1 | 3.9 | Coating solution (B1) | Coating solution (C1) |
| Example 2 | 3.6 | Coating solution (B2) | Coating solution (C1) |
| Example 3 | 4.2 | Coating solution (B2) | Coating solution (C1) |
| Example 4 | 2.5 | Coating solution (B3) | Coating solution (C1) |
| Example 5 | 2.3 | Coating solution (B1) | Coating solution (C2) |

17

TABLE 2-continued

| | Anti-reflective film | | |
| --- | --- | --- | --- |
| | Tensile strength ratio* | Hard coating layer | Low refractive index layer |
| Comparative Example 1 | 1.0 | Coating solution (B3) | Coating solution (C1) |
| Comparative Example 2 | 1.5 | Coating solution (B2) | Coating solution (C1) |
| Comparative Example 3 | 1.2 | Coating solution (B2) | Coating solution (C1) |
| Comparative Example 4 | 1.9 | Coating solution (B1) | Coating solution (C2) |
| Comparative Example 5 | 1.7 | Coating solution (B1) | Coating solution (C2) |

*tensile strength ratio: a ratio of tensile strength in one direction having larger value, to tensile strength in a direction perpendicular to the one direction having smaller value, in the low moisture permeable polymer film Evaluation 1. Evaluation of Transmission Mode X-Ray Diffraction (XRD)

For the anti-reflective films obtained in Examples and Comparative Examples, 2 cm*2 cm (width*length) samples were prepared, and then, Cu-Kα rays of 1.54 Å wavelength were irradiated.

Specifically, 10 samples were overlapped and fixed in a holder, and positioned on a gomiometer center. The samples were stacked such that one direction having lower tensile strength and a direction perpendicular to the one direction having higher tensile strength in each low moisture polymer film of each sample are the same.

As the measuring apparatus, Bruker AXS D8 Discover XRD was used, the voltage and current used were respectively 50 kV and 1000 μA, and the optics and detector used were as follows.

Primary (incident beam) optics: beam collimator (0.3 mm)

Secondary (diffracted beam) optics: none

VANTEC-500 (2D detector)

θ was fixed to 0° and detector was fixed to 24° such that a (010) crystal plane in the low moisture permeable polymer film is measured around 2 θ=17.6°, and then, measurement was conducted at psi 0° to 90° at an interval of 30°, 2400 seconds with 4 frame, using 0.33 mm beam collimator. The conversion of X-ray diffraction pattern by the Cu-Kα rays and the analysis were conducted using DIFFRAC.EVA program of Bruker, and by 2 θ-integration of the region having 2 θ of 17.25° to 18.25° using wedge cursor, converted into 1 D-pattern.

Each pattern measured and converted at each psi position was shifted each 30°, 60°, and 90° so as to correspond to the practically measured chi value and combined, and the pattern was shifted such that the extreme value in data obtained at Chi 0° is positioned at gamma 0°, thus obtaining the azimuthal angle distribution curve.

In the azimuthal angle distribution curve, the X-axis is gamma (degree) and 0° is a position where a stretching axis is perpendicular to a sample stage, and the Y-axis is integrated intensity of the (010) plane, and intervals between peaks appearing at the azimuthal angle distribution curve were measured and the arithmetic mean was calculated, and the results were shown in the following Table 3.

Meanwhile, FIG. 1 and FIG. 2 shows transmission mode diffraction pattern of the anti-reflective film of Example 1. Particularly, in FIG. 1 and FIG. 2, the anti-reflective film of Example 1 is rotated 90° and is abraded. FIG. 3 shows the azimuthal angle distribution curve calculated from the anti-reflective film of Example 1, and FIG. 4 shows the azimuthal angle distribution curve calculated from the anti-reflective film of Comparative Example 1.

2. Evaluation of Average Reflectance

The rear side (one side of the low moisture permeable polymer film on which a hard coating layer is not formed) of each anti-reflective film obtained in Examples and Comparative Examples was darkened, and then, average reflectance in the wavelength region of 380 nm to 780 nm was measured using a reflectance mode of Solidspec 3700 (SHIMADZU), and the results were shown in the following Table 3.

3. Evaluation of Average Reflectance Deviation

For each anti-reflective film obtained in Examples and Comparative Examples, 20 points were randomly selected, and for each point, average reflectance was measured by the method of 2. Evaluation of average reflectance. Thereafter, the arithmetic mean of the measured average reflectances of 20 points was calculated. Thereafter, a difference (absolute value) between the average reflectance at each point and the arithmetic mean was defined as average reflectance deviation, and each average reflectance deviation was calculated at each of 20 points. Among the 20 average reflectance deviations, the largest average reflectance deviation was described in the following Table 3.

4. Evaluation of Light Transmittance Deviation

For each anti-reflective film obtained in Examples and Comparative Examples, 20 points were randomly selected, and for each point, light transmittance was measured.

Specifically, average light transmittance in the wavelength region of 380 to 780 nm was measured using a transmittance mode of Solidspec 3700 (SHIMADZU).

Thereafter, the arithmetic mean of the measured light transmittances of 20 points was calculated. Thereafter, a difference (absolute value) between the light transmittance at each point and the arithmetic mean was defined as light transmittance deviation, and each light transmittance deviation was calculated at each of 20 points. Among the 20 light transmittance deviations, the largest light transmittance deviation was described in the following Table 3.

5. Evaluation of Moisture Permeability

The moisture permeability of each anti-reflective film obtained in Examples and Comparative Examples was measured at a temperature of 38° C. and relative humidity of 100%, using MOCON test apparatus (PERMATRAN-W, MODEL 3/61).

TABLE 3

| | Mean of intervals between peaks (°) | Average reflectance (%) | Average reflectance deviation (% p) | Light transmittance deviation (% p) | Moisture permeability (g/m² · day) |
| --- | --- | --- | --- | --- | --- |
| Example 1 | 173 | 1.05 | 0.04 | 0.02 | 10.61 |
| Example 2 | 181 | 1.13 | 0.11 | 0.09 | 11.18 |
| Example 3 | 195 | 1.12 | 0.07 | 0.08 | 10.44 |
| Example 4 | 169 | 1.07 | 0.16 | 0.11 | 12.21 |
| Example 5 | 177 | 1.6 | 0.03 | 0.15 | 11.81 |
| Comparative Example 1 | 103.3 | 1.13 | 0.35 | 0.22 | 12.35 |
| Comparative Example 2 | 79.8 | 1.04 | 0.26 | 0.23 | 10.54 |
| Comparative Example 3 | 46.5 | 0.99 | 0.28 | 0.3 | 11.38 |
| Comparative Example 4 | 50.6 | 1.55 | 0.25 | 0.28 | 11.25 |
| Comparative Example 5 | 52.1 | 1.5 | 0.35 | 0.32 | 10.91 |

From the Table 3, it was confirmed that Examples 1 to 4 fulfill intervals between peaks of 160 to 200°, and have remarkably low average reflectance deviation and light transmittance deviation, compared to Comparative Examples 1 to 4.

What is claimed is:

1. An anti-reflective film comprising a low moisture permeable polymer film; a single hard coating layer; and a low refractive index layer, wherein the anti-reflective film has a mean of intervals between peaks of 173 to 195° in an azimuthal angle distribution curve calculated from an azimuthal scan of diffraction pattern obtained by transmission mode X-ray diffraction (XRD), at 2θ of 17 to 18°, wherein the hard coating layer comprises a binder resin and organic fine particles and inorganic fine particles both dispersed in the binder resin, wherein the low refractive index layer comprises a binder resin, and inorganic fine particles dispersed in the binder resin, wherein the binder resin comprises 30% by weight of copolymer of photopolymerizable compounds, wherein the binder resin of the hard coating layer consists of dipentaerythritol hexaacrylate, pentaerythritol triacrylate, urethane acrylate polymer, and urethane acrylate, a reaction product of toluene diisocyanate and pentaerythritol triacrylate, the molecular weight of the urethane acrylate is 1,000 to 10,000 and the number average molecular weight of the urethane acrylate polymer is 13,000 or more, and wherein the anti-reflective film has an average reflectance deviation of 0.07% p or less, and a light transmittance deviation of 0.08% p or less, wherein the binder resin of the low refractive index layer further comprises a crosslinked polymer of a photopolymerizable compound, a fluorine-containing compound comprising a photoreactive functional group, and a polysilsesquioxane substituted with one or more reactive functional groups, wherein the fluorine-containing compound comprising a photoreactive functional group comprises one or more compounds selected from the group consisting of i) aliphatic compounds or alicyclic compounds substituted with one or more photoreactive functional groups, in which at least one carbon is substituted with one or more fluorine atoms; ii) heteroaliphatic compounds or heteroalicyclic compounds substituted with one or more photoreactive functional groups, in which at least one hydrogen is substituted with fluorine, and at least one carbon is substituted with silicon; iii) polydialkyl siloxane-based polymer substituted with one or more photoreactive functional groups, in which at least one silicon is substituted with one or more fluorine atoms; and iv) polyether compounds substituted with one or more photoreactive functional groups, in which at least one hydrogen is substituted with fluorine, wherein the low moisture permeable polymer film has a thickness direction Retardation (Rth) measured at a wavelength of 550 nm, of 5,000 nm or more, wherein the anti-reflective film has an average reflectance in the wavelength region of 380 nm to 780 nm, of 2.0% or less.

2. The anti-reflective film according to claim 1, wherein the azimuthal angle distribution curve contains at least 3 peaks.

3. The anti-reflective film according to claim 1, wherein the reactive functional group substituted at polysilsesquioxane includes one or more functional groups selected from the group alcohol, amine, carboxylic acid, epoxide, imide, (meth)acrylate, nitrile, norbornene, olefin, polyethyleneglycol, thiol and vinyl groups.

4. The anti-reflective film according to claim 1, wherein the inorganic fine particles include one or more nanoparticles selected from solid inorganic nanoparticles having an average diameter of 0.5 to 100 nm, and hollow inorganic nanoparticles having an average diameter of 1 to 200 nm.

5. The anti-reflective film according to claim 1, wherein the low moisture permeable polymer film is a polyethylene terephthalate film.

6. A polarizing plate comprising the anti-reflective film according to claim 1, and a polarizer.

7. A display apparatus comprising the anti-reflective film according to claim 1.

* * * * *